US009485620B2

United States Patent
Henson et al.

(10) Patent No.: US 9,485,620 B2
(45) Date of Patent: Nov. 1, 2016

(54) DYNAMIC EVENT NOTIFICATION SYSTEM FOR MOBILE DEVICES

(71) Applicants: Denice M. Henson, Midland, MI (US); Karl Richard Kohlbrand, Clare, MI (US); Scott Robert Simons, Traverse City, MI (US); Brian Jay Cobb, Bay City, MI (US); Brian Reid Henson, Midland, MI (US)

(72) Inventors: Denice M. Henson, Midland, MI (US); Karl Richard Kohlbrand, Clare, MI (US); Scott Robert Simons, Traverse City, MI (US); Brian Jay Cobb, Bay City, MI (US); Brian Reid Henson, Midland, MI (US)

( * ) Notice: Subject to any disclaimer, the term of this patent is extended or adjusted under 35 U.S.C. 154(b) by 0 days.

(21) Appl. No.: 14/627,371

(22) Filed: Feb. 20, 2015

(65) Prior Publication Data

US 2015/0237475 A1  Aug. 20, 2015

Related U.S. Application Data

(60) Provisional application No. 61/966,232, filed on Feb. 20, 2014.

(51) Int. Cl.
*H04W 24/00* (2009.01)
*H04W 4/02* (2009.01)
*G06Q 10/10* (2012.01)
*H04W 4/04* (2009.01)

(52) U.S. Cl.
CPC ......... *H04W 4/021* (2013.01); *G06Q 10/1093* (2013.01); *H04W 4/046* (2013.01)

(58) Field of Classification Search
CPC combination set(s) only.
See application file for complete search history.

(56) References Cited

U.S. PATENT DOCUMENTS

| 9,307,033 | B1* | 4/2016 | Meschkat | H04L 67/18 |
|---|---|---|---|---|
| 2010/0052946 | A1* | 3/2010 | Levine | G08G 1/143 |
| | | | | 340/932.2 |
| 2010/0057336 | A1* | 3/2010 | Levine | G01C 21/32 |
| | | | | 701/532 |
| 2010/0198367 | A1* | 8/2010 | Petricoin, Jr. | G01S 5/0018 |
| | | | | 700/17 |
| 2010/0231383 | A1* | 9/2010 | Levine | H04W 52/0261 |
| | | | | 340/540 |
| 2013/0006522 | A1* | 1/2013 | Vellaikal | H04W 4/023 |
| | | | | 701/426 |
| 2013/0031169 | A1* | 1/2013 | Axelrod | H04L 67/306 |
| | | | | 709/204 |
| 2013/0096813 | A1* | 4/2013 | Geffner | H04W 4/003 |
| | | | | 701/117 |
| 2013/0173155 | A1* | 7/2013 | Fino | G01C 21/20 |
| | | | | 701/533 |
| 2015/0181551 | A1* | 6/2015 | Sonnenburg | G08G 1/0112 |
| | | | | 455/456.1 |
| 2015/0350827 | A1* | 12/2015 | Birch | H04W 8/04 |
| | | | | 455/456.1 |
| 2016/0110433 | A1* | 4/2016 | Sawhney | G06F 17/2785 |
| | | | | 707/722 |

\* cited by examiner

*Primary Examiner* — Sam K Ahn
*Assistant Examiner* — Fabricio R Murillo Garcia
(74) *Attorney, Agent, or Firm* — Thomas P. Heed

(57) ABSTRACT

Disclosed is a method for delivering emergent event notifications to a user's Mobile Device. Map and Calendar applications are polled with correlations made between map locations and event information. Geo-Fence Boundaries are established for map locations which are inherited by their associated events. Penetration of a Geo-Fence Boundary by a Mobile Device running the Mobile Application triggers a search for events that are associated with the established Geo-Fence Boundary. Filtered Notifications of event options of interest to the user are transmitted to the Mobile Device based on pre-established and dynamic variables and whether the user can arrive at the event while it is underway. Upon selection of an event by the user, the Mobile Device provides route and navigation guidance to the selected location.

12 Claims, 6 Drawing Sheets

DYNAMIC EVENT NOTIFICATION SYSTEM FOR MOBILE DEVICES

This application claims the benefit of U.S. Provisional Application No. 61/966,232, filed Feb. 20, 2014.

FIELD OF INVENTION

The present invention generally relates to event Notifications for Mobile Devices and more specifically to dynamic, timely event Notifications tied to locations on a Map to benefit travelers along a route.

BACKGROUND

Notifications to users on mobile and other devices are being used in a variety of ways. These types of Notifications methods are becoming more advanced and sophisticated as users want more relevant information wherever they are, and at the point of time they need it.

As used herein, a "Map" may be defined as a map populated by a community using a mapping platform such as Google Maps, Apple Maps, Bing Maps, or a Map used in GPS Systems, IVI (In Vehicle Infotainment) and 3D navigation systems or, any other mapping application utilized in Mobile Devices, delivered through a website, uses API's or that utilizes wireless or other technologies to access the internet. The term "Map Location" refers to any point of interest that has been identified on a Map manually or programmatically. The term "Calendar" refers to any web based Calendar or software application utilizing API's and captures information about an event. Calendar types may include such as EventBrite®, Trumba®, or Google® Calendar. The term "API" refers to an Application Protocol Interface software component in terms of its operations, inputs, outputs, and underlying types that are not limited to use in mapping and calendaring applications and could be used to integrate them to an online database. The term "Mobile Device" may be defined as a portable computing device such as a smartphone or tablet computer, navigation devices used for personal or commercial use. The term "Mobile Application" may be defined as a software application developed specifically for use on small, wireless computing devices, such as smartphones and tablets, rather than desktop or laptop computers. The term "Geo-Fence Boundary" is defined as the outer edge of a virtual perimeter for a real-world geographic area that in this invention interacts with the database and user's location to trigger the event Notifications process using methods outlined below. The term "Notifications" refers to a message or alert delivered by a centralized server to a user's Mobile Device even when the user is not actively using the Mobile Application. The term "Filter" refers to the process and methods utilized in a system or program to prevent receipt of undesired content. The Filter processes described in this invention are implemented through both the database on the server and Mobile Application/Mobile Device.

These interfaces, although useful, tend to focus on retail establishments whereas this invention is designed to solve a problem for the everyday traveler passing through unfamiliar areas. Often travelers miss events they would enjoy attending because they are unaware, don't know how far away an event is, or if they have time to arrive while the event is underway. Travelers do not have a method to help them quickly analyze their options, Filter them to those of particular interest, and then confirm whether they can arrive at the event in time to participate. For example, if a community creates a Map highlighting points of interest to promote their town, this invention allows them to correlate events to locations on their Map so that when a person opts to attend an event, the person will have a seamless interface when it comes time to eat, or get a hotel room for the evening. This invention associates points of interest on a Map to events, establishes a Geo-Fence Boundary around those points of interest, that is in turn used to Filter Notifications to a user's Mobile Device based on the ability to "arrive in time" and user's preferences. What the market needs is a method of sifting through a large amount of event information quickly, and notifying users of appropriate events and activities that match the user's interests. Such a method would allow a user to find interesting events in a new geographic area of which the user might otherwise be unaware.

BRIEF SUMMARY OF THE INVENTION

This invention is a method that uses timely filtered content and event Notifications to travelers along a route. The methods use a server, database, Mobile Application, Map and calendaring programs as well as input from the end user. Methods include filtering on a variety of input, utilizing Geo-Fence Boundaries that can be static or dynamic, utilizing servers or Mobile Devices to scan for new content, and a real-time data analysis that generates content of true interest to the user.

This method relies on the ability to associate events entered in an online calendaring application such as EventBrite, or Google Calendar to locations that have been identified on a Map such as Google Maps, Bing Maps, or other mapping applications. Dynamic Geo-Fence Boundaries are set around the Map Location that triggers the Notifications to a Mobile Device such as the Apple/Android phones or tablets. In one embodiment these Geo-Fence Boundaries change in size according to the start time of the event. A cloud based server such as Amazon houses a database similar to MySQL that runs unique algorithms on data pulled from the Map, event information stored in the calendar, plus user preferences and interactions to Filter which Notifications are transmitted to the Apple, Android, or other Mobile Device through the Mobile Application. Events that fall into filtered content categories are displayed on the Mobile Device. Once travelers select an event, the route is displayed and standard navigation features of the device routes them to their selected event location.

Several of the methods used in this invention involve dynamic updates of the application's database for new events, adjusting Geo-Fence Boundaries per real time user needs, and the display of event options based on a predetermined Geo-Fence Boundary associated with a Map Location such as a point of interest.

In another example of the algorithms used to provide relevant options for the user includes, Map Location, event date, event start time, event end time, user preferences, user's location, and advertising agreement between event sponsor and Mobile Application company. Not all the methods by which information can be filtered and delivered to the Mobile Device are included in this patent application.

These and other features of the invention will be more readily understood upon consideration of the attached drawings and of the following detailed description of those drawings. This document does not cover all aspects of this invention.

BRIEF DESCRIPTIONS OF DRAWINGS

The accompanying figures serve to further illustrate various embodiments and to explain various principles and advantages all in accordance with the present invention, in which FIG. 1-4 diagram a real world situation where element represents a geographic region.

FIG. 1 identifies a Geo-Fence Boundary established around a Map Location and a user penetrating that Geo-Fence Boundary.

FIG. 2 identifies how filtered event information may be displayed after a user receives a Notification on his Mobile Device.

FIG. 3 identifies the desired event being selected by the user.

FIG. 4 identifies the device's routing and navigation feature guiding the user to the selected event.

FIG. 5 identifies the database, input sources that interact with it, and how algorithms are set up to generate filtered information for the user.

FIG. 6 identifies the major Map components that must be in place for the methods to work.

FIG. 7 identifies the major Calendar components that must be in place for the methods to work.

FIG. 8 identifies the major steps a user takes to acquire the Mobile Application and enable Notifications.

DETAILED DESCRIPTION

Detailed embodiments are disclosed herein; however, it is to be understood that the disclosed embodiments are merely examples and that the methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terminology used herein is for the purpose of describing particular embodiments and is not intended to be limiting of the invention.

Described is a method using computers, Mobile Devices, and databases to integrate a variety of data sources and execute mathematical operations to Filter the content that is displayed to a user regarding events that have been associated with a Map Location.

For the sake of clarity in these descriptions: The assumption is that a user has established settings in the Mobile Application to access user's location and accept Notifications.

Figure 1:
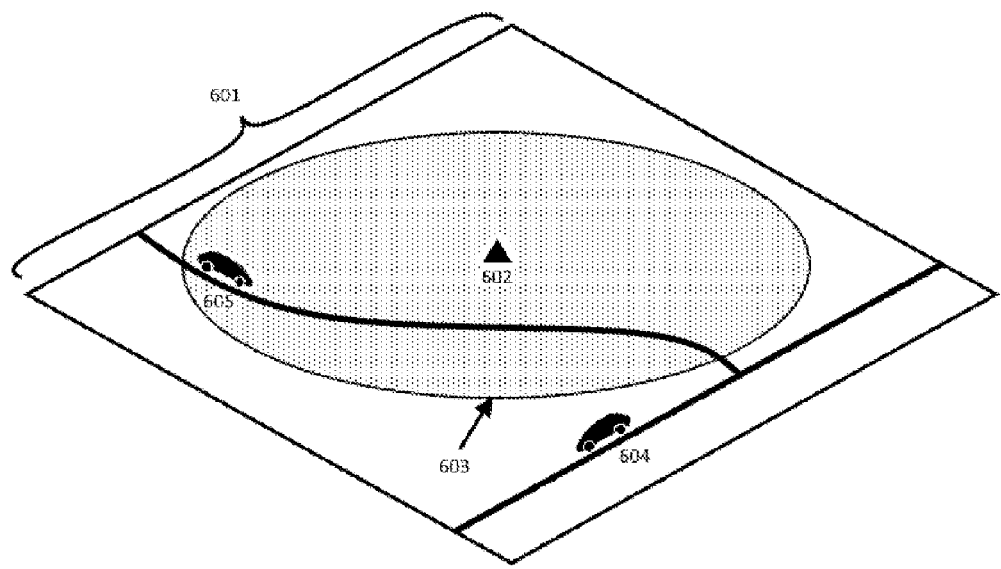

Turning now to FIG. 1 illustrates a user in a car (605) traveling down a route with a Mobile Device. The car penetrates a Geo-Fence Boundary (603) that has been established around a point of interest (602) on a Map (601). The user's device in (605) would trigger a communication to the server to look for event information related to that point of interest (602). Another route and car (604) do not penetrate the Geo-Fence Boundary so would not trigger any activity on the server or Notifications to the Mobile Device.

Figure 2:
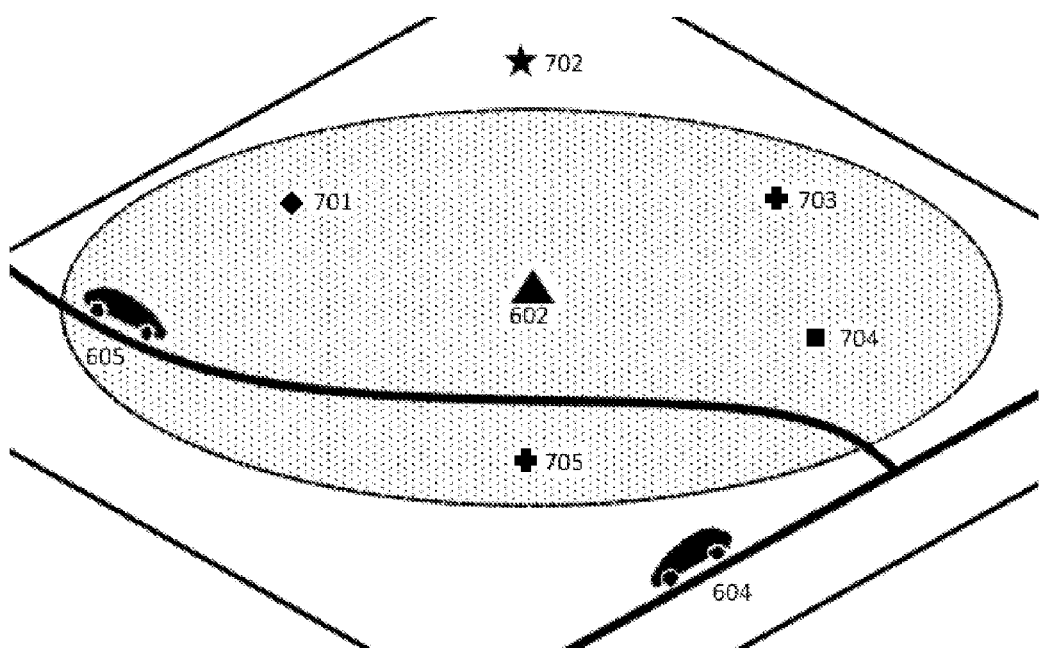

FIG. 2 describes what takes place if the server searches and finds relevant information for that user (605). The server would deliver a Notification to the Mobile Device and generate a Map or list display of different types of event options (701), (703), (704), & (705) set previously as user preferences in the Mobile Application. Only the events located within the Geo-Fence Boundary (603) associated with the point of interest (602) are displayed on the Mobile Device. Event (702) which, is outside the Geo-Fence Boundary is excluded from the display on the Mobile Device. User (604) is outside the Geo-Fence Boundary so neither receives Notifications or event options.

Figure 3:
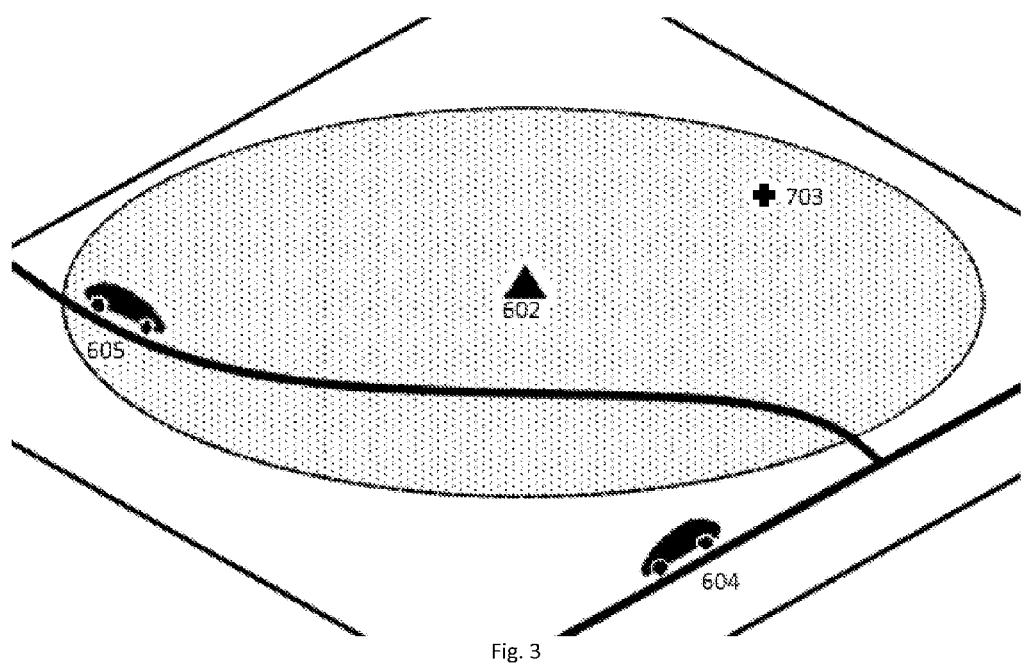

FIG. 3 illustrates a user (605) has selected an event (703) to attend. All the other event options are removed from the Map once a user selects an event.

Figure 4:
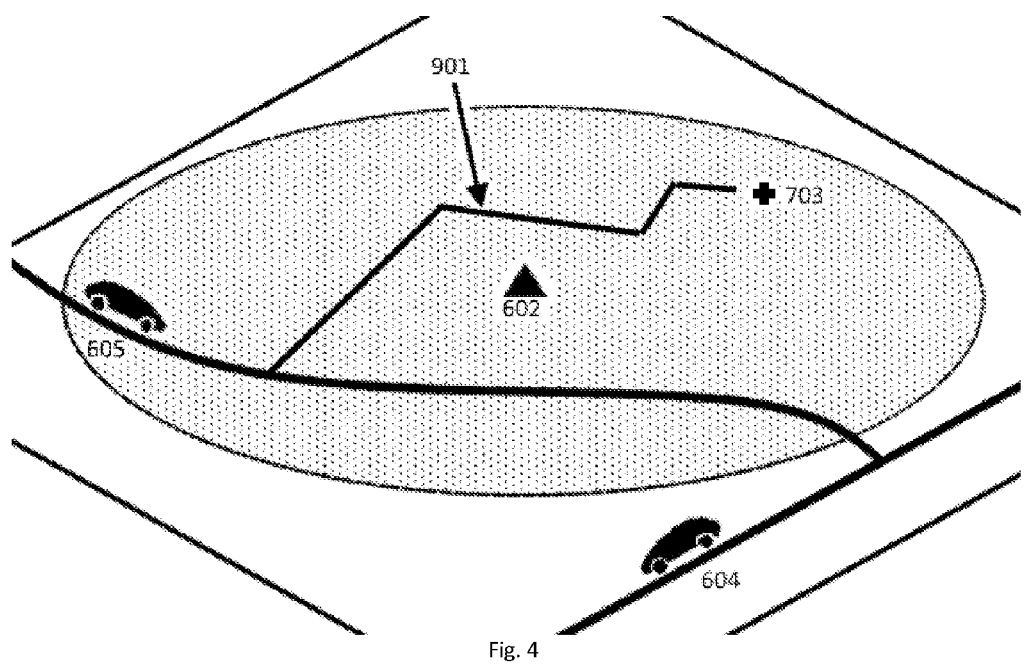

FIG. 4 illustrates when the user (605) has selected an event (703), routing and navigation programs will activate on the device and other Map Locations that are associated with the point of interest's Geo-Fenced Boundary (602) will display on the Map as well.

Figure 5:
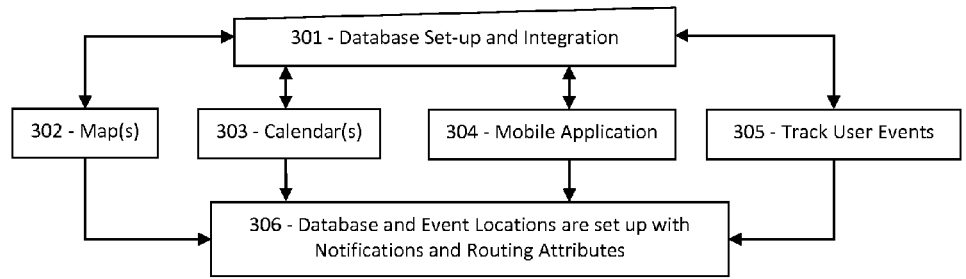

FIG. 5 describes how the database interacts with the various other components in the method. A database similar to MySQL (301) is created and housed on a cloud server such as Amazon. It is configured to integrate with the Map API (302), the Calendar API (303), the Mobile Application (304), and track user events (305) on the Mobile Device. Data from each source will be stored in the database (301) and the database will be programmed to run the processes to poll aspects of the database for data analysis.

Figure 6:
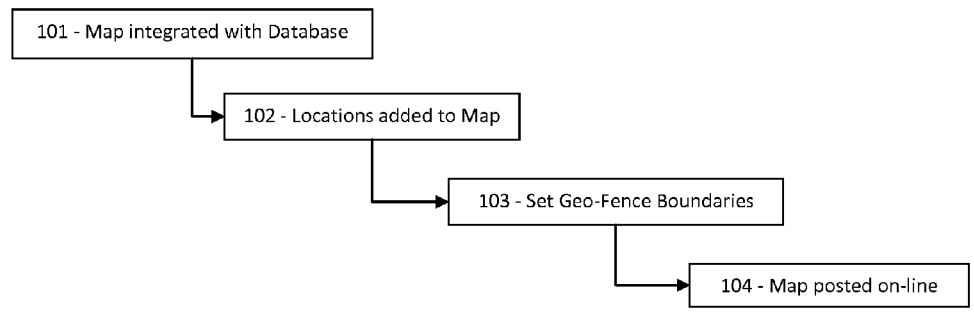

FIG. 6 a mapping application API is integrated with a content management system in a database (101). When points of interest are identified on the Map the database captures the GPS coordinates and assigns a unique ID to that location (102). Using a content management system or programmatically by the database, a Geo-Fence Boundary is established for each point of interest on the Map (103). The Map is made available online to the public (104).

Figure 7:
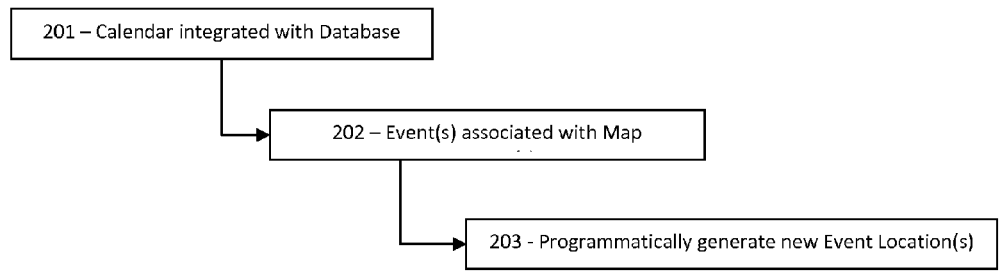

FIG. 7 illustrates the process of integrating the Calendar data in the database. Event Calendar administrator selects a calendaring application that has an API that can be integrated with a content management system's database and adds event information onto the Calendar that is assigned a unique ID (201). Through the content management system using IDs or other methods the Map and event are associated in the database (202). The event location information from the Calendar entry is captured to programmatically generate a GPS coordinate in the database that can be used later to be displayed on a Map (203).

Figure 8:
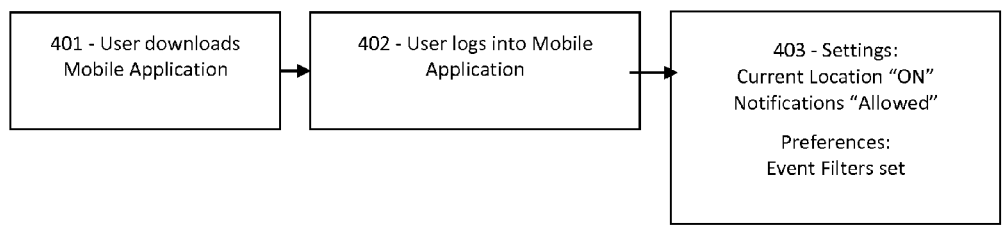

FIG. 8 outlines the user interactions that must take place to receive event Notifications. The user searches a Mobile Application store such as Google Playstore and installs the Mobile Application onto their device (401). The user is prompted to log into the Mobile Application (402). Once the user is logged in, they will be presented with automatic requests to allow the application to access the user's location and receive Notifications. Once permissions have been given, the user will be presented with a preferences page that allows them to set preferences for type of content, frequency of Notifications, and whether they want the Mobile Application to integrate with their personal Calendar (403).

Figure 9:
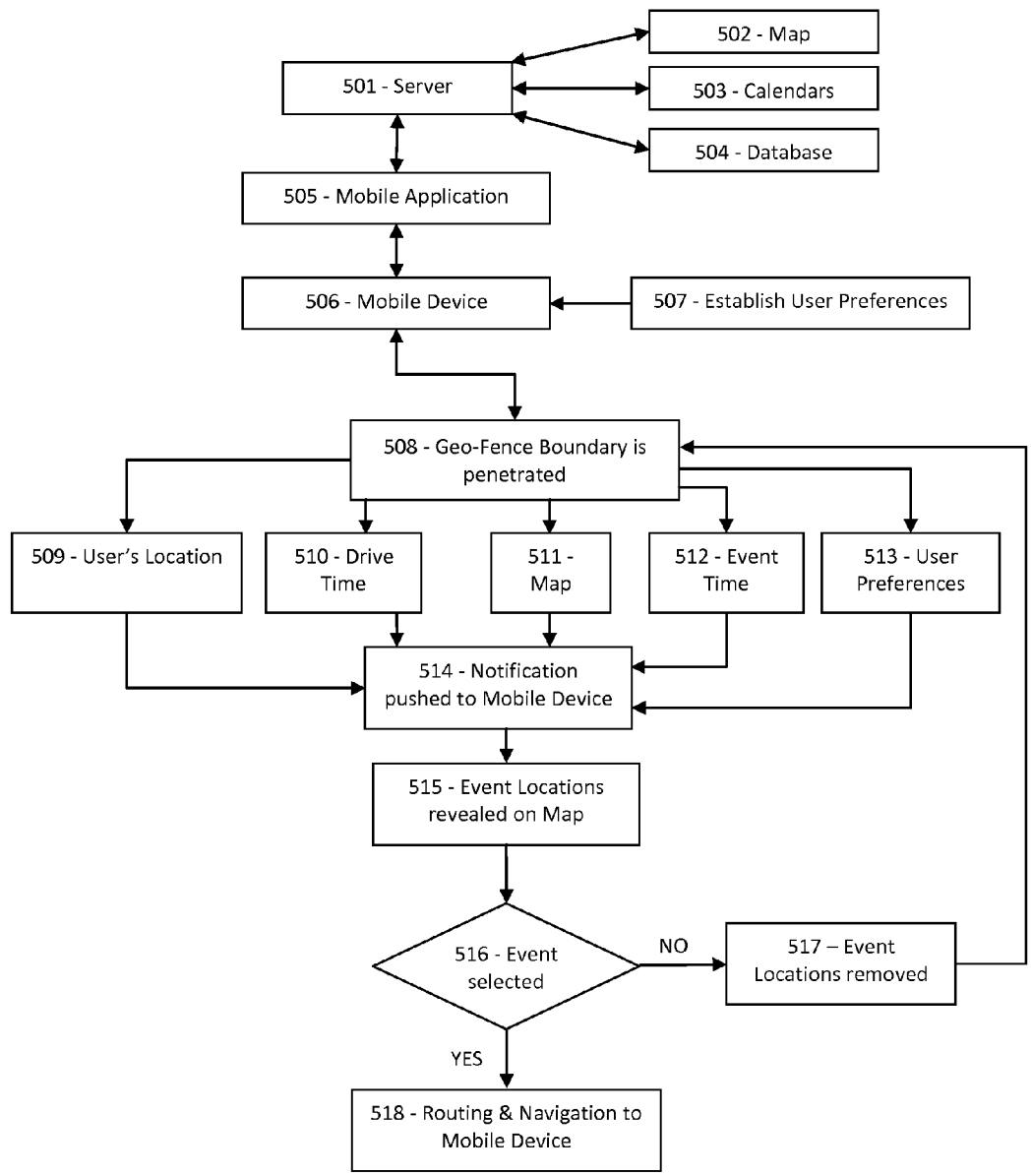
FIG. 9 is a functional flow chart showing the interaction and sequence of the process using a combination of physical components for carrying out the operation.

FIG. 9 identifies the interactions of the computing devices and Mobile Application (505). The server (501) is configured to house the database (504), a processing unit that will run the mathematical models to Filter content, and uses dynamic memory capabilities to facilitate faster response times (501). The server (501) continually scans the Map (511) and Calendar (503) APIs for new content, updates the database (504), and sends updates to and receives information from the Mobile Application (505).

To receive Notifications and allow the Mobile Application to track the Mobile Device's location, the user must have the Mobile Application open and running in the background if other applications are being used. If the user turns the Mobile Application (505) off, all Notifications (514) will stop.

The user is presented with a preferences page and sets preferences for type of content, frequency of Notifications, and whether they want the application to integrate with their personal Calendar, and other pre-defined variables (507). The Mobile Application sends this data to the database (504) where it will be used to help Filter content that is delivered to the user.

Once the Mobile Device (506) penetrates a Geo-Fence Boundary (508), the Mobile Application (505) triggers a notice to the server (501) to search for event information that is associated to the Map Location whose Geo-Fence boundary (508) was just penetrated.

The server (501) then polls data sources (503), (504), (509), (510), (511), (512), (513) and uses mathematical programs in the central processing unit of the server to Filter content based on user's location (509), time it will take the user to arrive at any of the events within that established Geo-Fence Boundary (510), the GPS coordinates of the Map Location (511), the event dates and start/stop time (512), and user preferences (513).

When the filtering process is complete, and found to contain relevant information for the user, the server generates a Map Location for each event, populates a display template with user options, and a Notification (514) is sent to the Mobile Device. If there is insufficient time for the user to travel to and attend an event, an event would not be displayed even if the event is within the Geo-Fence Boundary.

Upon receipt of Notification (514), the event locations of the filtered list are revealed (515) in a list or per their GPS coordinates on a Map on the Mobile Device display. If the location whose Geo-Fence Boundary was penetrated is associated with a mapped area, all the points of interest on that Map are downloaded in the background of the Mobile Application.

If the user does not make a selection from the options presented, the event locations are removed (517) from the Mobile Device display per a default time period or user's preferences (517) and the Mobile Application runs in the background waiting until the Mobile Device penetrates another Geo-Fence Boundary (508).

If the user decides they want to attend an event, they can select it on the Map (516). This interaction is tracked on the Mobile Device (506) and shared with the server (501. Once the user selects an event on the Map or list display (516) on the Mobile Device, all the points of interest from the associated Map Location become visible on the Map (515) and the Mobile Device's routing and navigation system activate guiding the user to the event (518).

Figure 10:
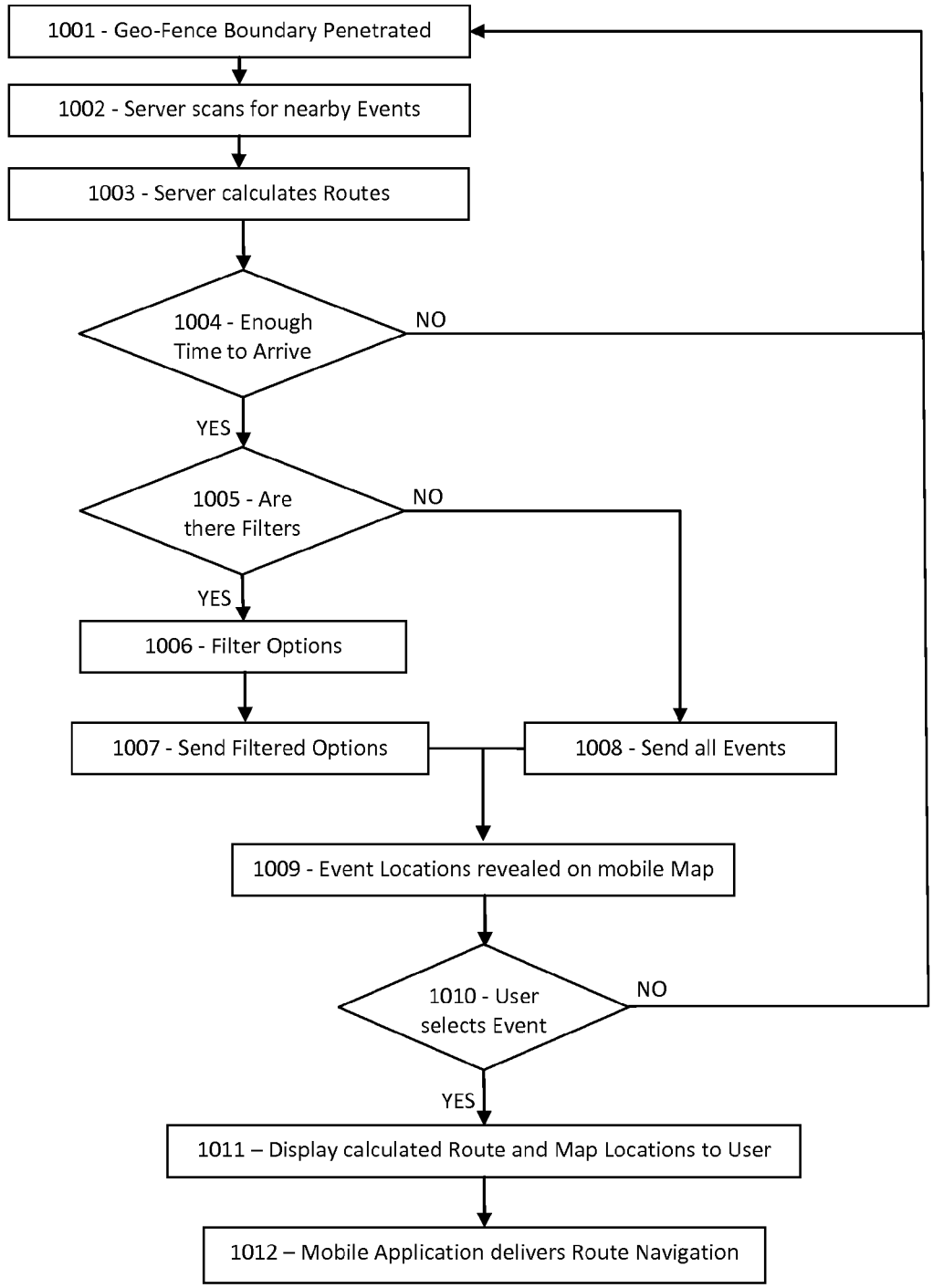
FIG. 10 is a flow chart of the operational phase of carrying out the present invention.

FIG. 10 diagrams the operational steps and sequences that take place in the computing devices, database, and user interactions within the methods incorporated into this invention.

a user has the Mobile Application installed and running on their device and penetrates a Geo-Fence Boundary (1001) the server scans the database looking for nearby events (1002). Once all possible events are identified, the mathematical programs are executed that Filter driving routes and travel times to the event from the user's location, and (1003) those events the user could reach "in time" to participate (1004). If there is not enough time for the user to arrive at the event, the server will re-set and wait for the Mobile Device to cross another Geo-Fence Boundary.

If there is enough time to attend any of the events, the server will look to see if the user has established Filter preferences (1005). If there are no filters, the server will deliver Notifications for all event options (1008) to the user's Mobile Device. If the user has applied a Filter (1006) in their user preferences, the server will deliver filtered options (1007) to the Mobile Device and event options will be revealed on the Mobile Device display as locations on a Map or a list (1009)

The user will then have the option to select an event from the list of options (1010). If they do not select an event, the server clears the options after a pre-determined time, removing the event locations from the Mobile Device display, and waits for the Mobile Device to penetrate another Geo-Fence Boundary (1001).

Once the user selects an event (1010) on the Mobile Device display, all the points of interest from the associated Map Location become visible on the Map and the Mobile Device's routing and navigation system (1012) become activate guiding the user to the event.

The invention claimed is:

1. A method for delivering emergent event notifications to a user's mobile device, about which the user would otherwise be unfamiliar due to geographical location, comprising:
 a server;
 at least one application protocol interface (API), embodied on a first non-transitory computer readable medium, and associated circuitry, that links the server with a database, allowing the server to perform analysis of data elements contained in the database;
 a software application, resident on a user's mobile device and embodied on a second non-transitory computer readable medium, that enables the user's mobile device to communicate with the server through the at least one API;
 at least one calendar containing a plurality of unique calendar events, resident on the database, or accessible through the at least one API, wherein each calendar event is unfamiliar to the user's mobile device and associated with a preference category, a map location, a time, and a unique dynamic geo-fence;
 defining the unique dynamic geo-fence as a geographically limited area surrounding said map location to govern timing of notifications and govern which event information, from the plurality of unique calendar events, is polled when a user crosses that unique dynamic geo-fence;
 filtering the event information to deliver timely event notifications, based on user-defined preference categories, user's travel speed and trajectory, and the unique dynamic geo-fence boundaries;
 transmitting and delivering notifications to a mobile display of the user's mobile device, allowing the user to select a location from at least one of the filtered event information and map location;
 providing route and navigation guidance to selected location; and
 displaying, in the mobile display, of relevant information about a selected event from the filtered event information once the user reaches the selected location;

wherein if there is insufficient time for the user to travel and attend an event in the selected location, said event in the selected location would not be displayed even if said event in the selected location is within the geo-fence boundary.

2. The method for delivering emergent event notifications to a user's mobile device, about which the user would otherwise be unfamiliar due to geographical location of claim 1 wherein said database is updated bi-directionally by the server polling the mobile device for designated fields of interest; the mobile device communicating said fields of interest to the server; the server automatically assigning a unique identifier (ID) and global positioning system (GPS) coordinates to each location or event corresponding to user's preferences for said designated fields of interest and for user interaction data.

3. The method for delivering emergent event notifications to a user's mobile device, about which the user would otherwise be unfamiliar due to geographical location of claim 2, wherein correlations are made between said map locations and said events using unique IDs using at least one of manually associating said map locations and events by map or calendar administrators; automatically assigning the GPS coordinates of said map locations and said events using distance parameters; automatically assigning the GPS coordinates of said maps locations and said events using, dynamically changing traveling speeds; automatically assigning the GPS coordinates of said maps locations and said events using, dynamically changing unique dynamic geo-fence boundaries; and anchoring IDs to one map but allowing association with another map.

4. The method for delivering emergent event notifications to a user's mobile device, about which the user would otherwise be unfamiliar due to geographical location of claim 3 wherein correlations are made between one said map location and at least one said events.

5. The method for delivering emergent event notifications to a user's mobile device, about which the user would otherwise be unfamiliar due to geographical location of claim 3 wherein said unique dynamic geo-fence boundaries are set for said map locations that govern what events are polled when the mobile device penetrates said unique dynamic geo-fence boundaries; and said unique dynamic geo-fence boundaries are adjusted based on at least one of manual input from an event administrator, manual input of user preference, manual input from a map administrator, and automatically, based on speed and location of user.

6. The method for delivering emergent event notifications to a user's mobile device, about which the user would otherwise be unfamiliar due to geographical location of claim 5 wherein the server polls only events that are associated with a unique dynamic geo-fence boundary that has been penetrated by the mobile device.

7. The method for delivering emergent event notifications to a user's mobile device, about which the user would otherwise be unfamiliar due to geographical location of claim 2 wherein said filtering method is initiated on the polled events within the plurality of unique dynamic geo-fence boundaries using at least one of the user preferences, event location, date, event start and stop time, user's location, and travel time.

8. The method for delivering emergent event notifications to a user's mobile device, about which the user would otherwise be unfamiliar due to geographical location of claim 7 wherein relevant filtered content is displayed on the user's mobile display.

9. The method for delivering emergent event notifications to a user's mobile device, about which the user would otherwise be unfamiliar due to geographical location of claim 2 wherein by selecting an event, the application downloads the location of said event; the application transmits the location to the server; and the server activates the device's navigation system, using said location as the destination, directing the user to the event.

10. The method for delivering emergent event notifications to a user's mobile device, about which the user would otherwise be unfamiliar due to geographical location of claim 9 wherein by arriving at a selected event the relevant information and promotional information is brought up on the display of the user's device.

11. The method for delivering emergent event notifications to a user's mobile device, about which the user would otherwise be unfamiliar due to geographical location of claim 2 wherein the server manages notifications, mobile device application software updates, and user interaction data; and automatically generates a map location for each of the plurality of events.

12. The method for delivering emergent event notifications to a user's mobile device, about which the user would otherwise be unfamiliar due to geographical location of claim 11 wherein the user receives notifications in an emergent fashion; and the user controls the frequency of notifications and mobile device application software updates may be managed by user preferences.

* * * * *